Aug. 9, 1927.

R. H. BANKS

SHEET METAL BELT

Original Filed Jan. 11, 1926   2 Sheets-Sheet 1

1,638,466

INVENTOR.
Reeve H. Banks.
BY C. M. Clarke
ATTORNEY

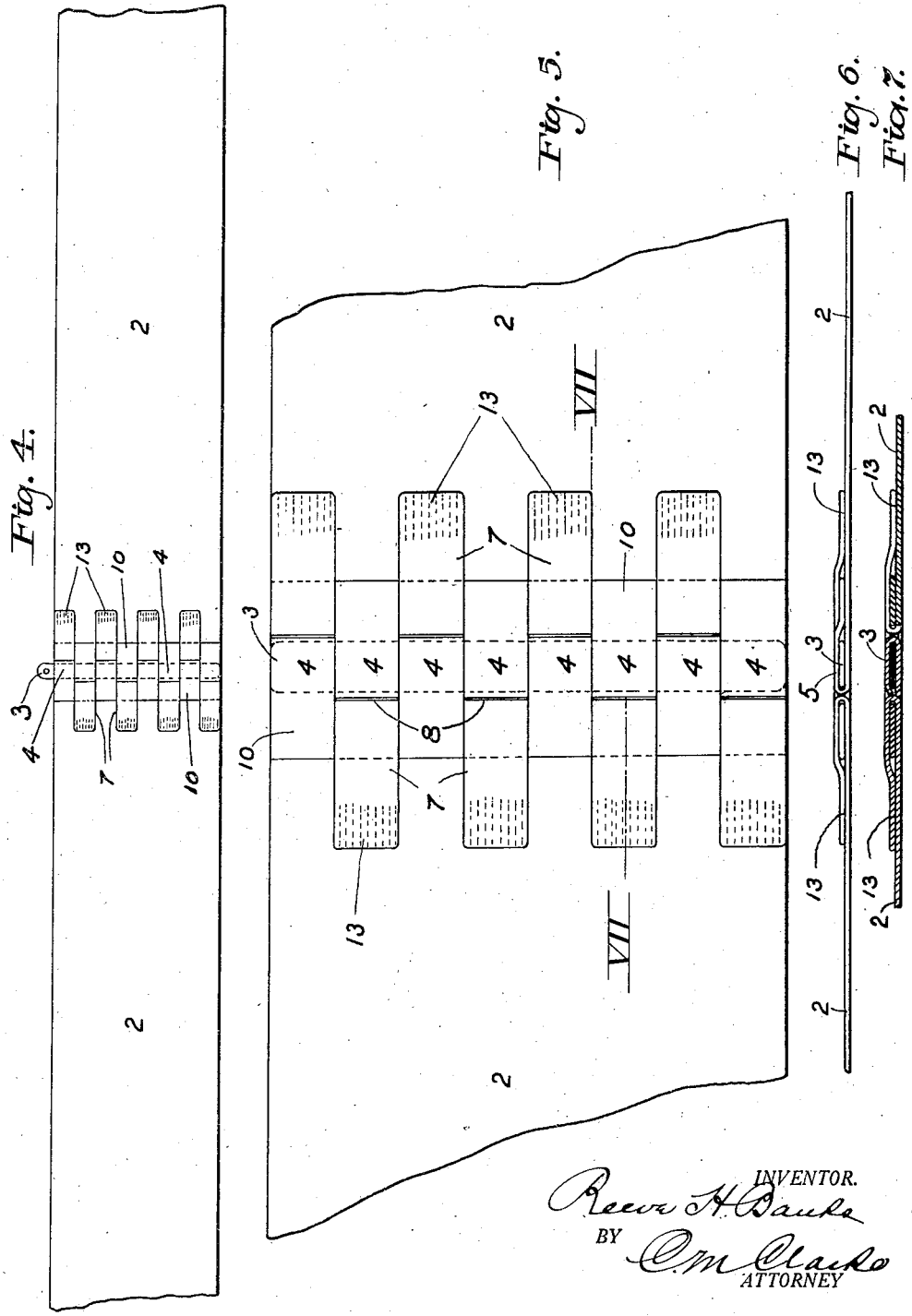

Patented Aug. 9, 1927.

1,638,466

UNITED STATES PATENT OFFICE.

REEVE H. BANKS, OF PITTSBURGH, PENNSYLVANIA, ASSIGNOR TO PITTSBURGH PRODUCERS SUPPLY COMPANY, OF PITTSBURGH, PENNSYLVANIA, A PARTNERSHIP.

SHEET-METAL BELT.

Application filed January 11, 1926, Serial No. 80,599. Renewed March 17, 1927.

My invention is an improvement in metal belts and particularly in the joint thereof. In belts of the kind involved, especially if used for continuous conveyors running over pulleys or sheaves, it is desirable to maintain smooth, even continuity of the belt without appreciable obstruction or interference, so as to pass freely and easily over the pulley surfaces.

In the use of continuous sheet metal belts, I have found that riveted or other similar connections, involving more or less obstruction from the face of the belt at either side is objectionable, while the strength of the joint is materially impaired and reduced to withstand the strains of service.

In my invention I overcome these difficulties, by folding the meeting terminal ends of the strands or sections of the belt so as to provide alternating loops, adapted to lie in the same general plane, for connection by an inserted transverse key, using portions of the belt itself to maintain the loops in the desired position for continuous tension throughout.

In the drawings, illustrating one preferred embodiment of the invention:

Fig. 4 is a plan view of a portion of a belt provided with my improved joint.

Fig. 5 is a similar view on an enlarged scale.

Fig. 6 is an edge view of Fig. 5.

Fig. 7 is a longitudinal sectional view on line VII—VII of Fig. 5.

The main body portion of the belt 2 of any desired width, depending upon the conveyor capacity, necessary area, and other conditions, is formed of a continuous strip of suitable thin sheet metal, as steel, brass, copper, rustless metal, or aluminum.

In the case of a short belt, one continuous strip may be used with a single joint. In longer lengths, the belt may be composed of a plurality of sections joined in the same way.

The joint is separably connected by a thin flat key 3, which connects the series of alternating loops 4 from one side to the other, such series being closely adjacent transversely of the belt from one outside edge to the other.

The loops 4 as shown, are formed by bending the slitted metal backwardly upon itself, providing the intervening key space 5 and the thickness of the metal only at each side thereof, so that when connected as in Figs. 4, 5, and 6, the entire thickness of the joint is but three times that of the gauge of the blank.

Figure 1:
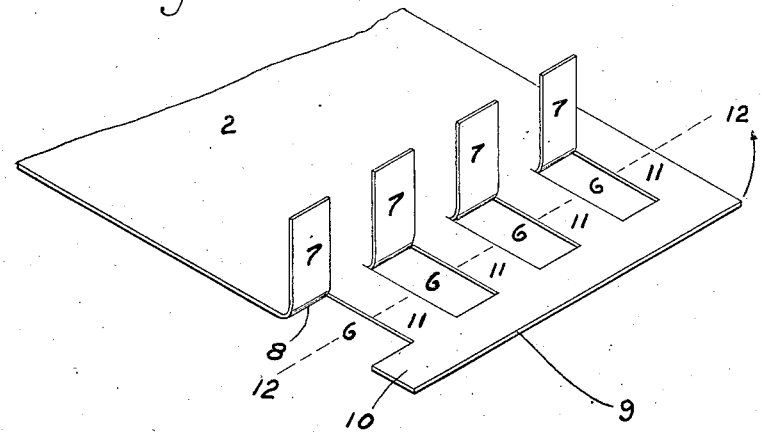
Fig. 1 is a view in perspective of one end of a sheet metal belt with portions thereof severed, to provide a loop forming blank.
Figure 2:
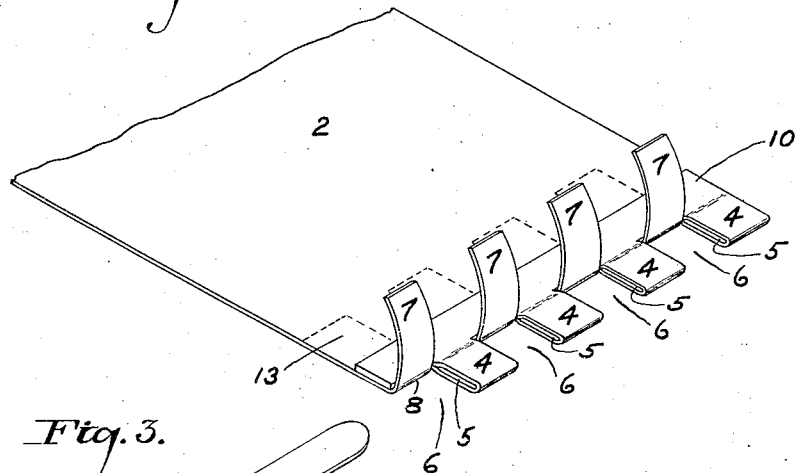
Fig. 2 is a similar view showing the end portion of the blank bent backwardly upon itself and the retaining tongues partially bent back, as in course of manufacture.
Figure 3:
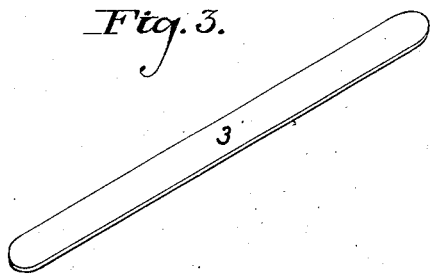
Fig. 3 is a similar view of the flat connecting key.

In preparing the end of the section 2 for making such joint, it is longitudinally and transversely slitted as shown in Fig. 1, providing the rectangular openings 6 and with the resulting tongues 7 integrally connected at their inner portions with the blank, as indicated at 8. As thus slitted, the front portions of openings 6 terminate backwardly from the front edge 9, a sufficient distance to leave a continuous transverse retaining strip 10. Such strip is laid back upon the face of the blank 2, just beyond the connection 8 of tongues 7, and in the rear of said tongues, so that they may be laid down across the strip and extend beyond it rearwardly as in Fig. 5.

In bending the metal sections 11 intervening between the front strip 10 and the main body of the blank, they are doubled upon themselves at their middle transverse portions, indicated by the dotted line 12, 12. In bending, a suitable mandrel is used so as to provide the intervening key-receiving cavity 5 of uniform size throughout. When the strip 10 is thus laid back against the blank, the tongues 7 are then bent rearwardly and downwardly tightly upon it and against the blank beyond, as shown.

The belts as thus formed, may then be tightly flattened under a suitable press, after which the ends of the tongues 7 are secured to the blank, preferably by silver solder or spot welding, as indicated at 13. In this manner, the several projecting loops 4 are integrally connected with the blank at one side, and with the continuous cross strip 10 at the opposite side, the strip being firmly held alternately between the loops by the tongues 7 and their welded connection.

Each end of the two interfitting terminals is made in the same manner, care being taken to arrange the loops 4 and spaces 6 alternately for proper interfitting connection with the companion terminals of the connected belt section.

In the construction shown, each section is provided with the same number of loops and alternating spaces for the interfitting loops and co-acting spaces of the connected section.

If preferred, however, either section may be provided with an outer loop at each edge and a continuous series of spaces and intervening loops clear across. In either case, the ends of one series of loops may be easily introduced into the cavities 6 between the corresponding loops of the other section, with the several spaces 5 in alinement. When the key 3 is inserted through all of the loops, they are continuously connected thereby.

The use of the key in this manner, through the comparatively flat thin loop series, insures substantial continuity of the belt surface with, but slight projection, so that it will pass over the face of a pulley or may be presented toward the load if desired without interference of any obstruction.

The advantages of the invention will be readily understood and appreciated by all those familiar with this class of devices, and it will be understood that it may be provided in any desired width or strength of material, depending upon the conditions of use, etc.

There is ample flexibility for passing around the pulley surfaces and due to the removable key connection, may be easily separated or joined when desired.

It will be understood that the invention may be changed or varied in different details of construction, design, etc., by the skilled mechanic, but all such changes are to be considered as within the scope of the following claims.

What I claim is:—

1. A sheet metal belt having its end slitted to provide a continuous terminal edge portion and alternating connecting loop members and free holding tongues, with the loop members bent back upon themselves and the terminal edge portion laid over upon the belt, and the tongues bent back over the terminal edge portion and secured to the belt.

2. A sheet metal belt having its end slitted to provide a continuous terminal edge portion and alternating connecting loop members and free holding tongues, with the loop members bent back upon themselves and spaced apart to provide keyway clearance, the terminal edge portion being laid over upon the belt, and the tongues being bent back over the terminal edge portion and secured to the belt.

3. A sheet metal belt provided with longitudinally slitted loop portions bent backwardly and provided with a transverse connecting strip, with intervening slitted tongues bent over said strip and secured to the body portion.

4. A sheet metal belt consisting of a body portion having at its end longitudinally and transversely slitted tongues providing alternating loop portions with a terminal connecting strip, with the loop portions bent backwardly across their middle portions and the tongues laid across the strip and secured to the body portion.

5. A sheet metal belt consisting of a body portion having at its end longitudinally and transversely slitted tongues providing alternating loop portions with a terminal connecting strip, with the loop portions bent backwardly across their middle portions with intervening key spaces, and the tongues laid across the strip and secured to the body portion.

6. A sheet metal belt consisting of a body portion having at its end longitudinally and transversely slitted tongues providing alternating loop portions with a terminal connecting strip, with the loop portions bent backwardly across their middle portions, and means securing the strip to the body portion.

7. A sheet metal belt consisting of a body portion having at its end longitudinally and transversely slitted tongues providing alternating loop portions with a terminal connecting strip, with the loop portions bent backwardly across their middle portions with intervening key spaces, and means securing the strip to the body portion.

8. A sheet metal belt section having its end portion longitudinally and transversely slitted to provide a loop portion and an adjacent clearance space for an interfitting loop, with the loop portion bent upon itself and secured to the body of the belt.

9. A sheet metal belt section having its end portion longitudinally and transversely slitted to provide a loop portion with a transverse strip and an adjacent partly severed tongue, with the loop portion bent upon itself and the strip lying against the belt surface and the tongue laid thereover and secured to the belt.

10. A sheet metal belt section having its end portion longitudinally and transversely slitted to provide a loop portion with a transverse strip and an adjacent partly severed tongue, with the loop portion bent upon itself and the strip lying against the belt surface and the tongue laid thereover and welded to the belt.

11. A joint for sheet metal belts consisting of adjacent sections each having alternating partly slitted loop and tongue portions laid reversely against and secured to one face of the belt and in interfitting engagement, the loops of one section alternating with those of the other, and a transverse connecting key extending through the several loops.

In testimony whereof I hereunto affix my signature.

REEVE H. BANKS.